(12) United States Patent
Klosterman

(10) Patent No.: US 8,266,655 B2
(45) Date of Patent: Sep. 11, 2012

(54) MULTI-SOURCE SWITCHING IN A TELEVISION SYSTEM

(75) Inventor: Brian Lee Klosterman, San Ramon, CA (US)

(73) Assignee: Starsight Telecast, Incorporated, Fremont, CA (US)

( * ) Notice: Subject to any disclaimer, the term of this patent is extended or adjusted under 35 U.S.C. 154(b) by 799 days.

(21) Appl. No.: 11/841,520

(22) Filed: Aug. 20, 2007

(65) Prior Publication Data
US 2008/0134242 A1 Jun. 5, 2008

Related U.S. Application Data

(63) Continuation of application No. 10/441,475, filed on May 19, 2003, which is a continuation of application No. 09/612,352, filed on Jul. 6, 2000, now abandoned, which is a continuation of application No. 08/810,199, filed on Mar. 3, 1997, now abandoned, which is a continuation of application No. 08/423,410, filed on Apr. 17, 1995, now abandoned.

(51) Int. Cl.
*H04N 5/445* (2011.01)
(52) U.S. Cl. ............... 725/48; 725/39; 725/51
(58) Field of Classification Search .......... 725/39, 725/48, 51
See application file for complete search history.

(56) References Cited

U.S. PATENT DOCUMENTS

| | | |
|---|---|---|
| 3,730,986 A | 5/1973 | Morchand |
| 3,745,240 A | 7/1973 | Morchand et al. |
| 4,488,179 A | 12/1984 | Kruger et al. |
| 4,598,423 A | 7/1986 | Hettiger |
| 4,706,121 A | 11/1987 | Young |
| 4,751,578 A | 6/1988 | Reiter et al. |
| 4,776,038 A | 10/1988 | Testin et al. |
| 4,908,713 A | 3/1990 | Levine |
| 4,914,517 A | 4/1990 | Duffield |
| 4,977,455 A | 12/1990 | Young |
| 4,996,597 A | 2/1991 | Duffield |
| 5,123,046 A | 6/1992 | Levine |
| 5,151,789 A | 9/1992 | Young |
| 5,161,019 A | 11/1992 | Emanuel |

(Continued)

FOREIGN PATENT DOCUMENTS

DE 39 21 847 A 1/1991

(Continued)

OTHER PUBLICATIONS

Brugliera, "Digital On-Screen Display a New Technology for the Consumer Interface," *Symposium Record Cable Sessions*, Jun. 11, 1993, p. 571-586.

(Continued)

*Primary Examiner* — Pankaj Kumar
*Assistant Examiner* — Sahar Baig
(74) *Attorney, Agent, or Firm* — Ropes & Gray LLP

(57) ABSTRACT

The present invention provides a tuning scheme for coordinating schedule information and programs received from multiple sources (26, 28, 30 and 34). In the preferred embodiment, an identifier associated with the program's channel (52) is used to identify a source device (26, 28, 30 or 34). When a user selects a program (60 or 62) listed in displayed schedule information (50), the system (10) reads the source identifier attached to the program's channel (52). The system (10) then carries out an automatic switching/tuning such that the required source device (26, 28, 30 or 34) is input to the destination device (22), and a tuner is then tuned to the selected program's channel (52).

36 Claims, 4 Drawing Sheets

U.S. PATENT DOCUMENTS

| | | | |
|---|---|---|---|
| 5,179,439 A | | 1/1993 | Hashimoto |
| 5,231,494 A | | 7/1993 | Wachob |
| 5,307,173 A | * | 4/1994 | Yuen et al. .................. 386/83 |
| 5,353,121 A | * | 10/1994 | Young et al. .................. 725/52 |
| 5,410,344 A | | 4/1995 | Graves et al. |
| 5,436,676 A | | 7/1995 | Pint et al. |
| 5,485,630 A | | 1/1996 | Lee et al. |
| 5,550,576 A | | 8/1996 | Klosterman |
| 5,576,755 A | | 11/1996 | Davis et al. |
| 5,589,892 A | * | 12/1996 | Knee et al. .................. 725/43 |
| 5,619,274 A | | 4/1997 | Roop et al. |
| 5,625,406 A | | 4/1997 | Newberry et al. |
| 5,635,978 A | | 6/1997 | Alten et al. |
| 5,635,989 A | | 6/1997 | Rothmuller |
| 5,640,484 A | * | 6/1997 | Mankovitz .................. 386/83 |
| 5,642,153 A | | 6/1997 | Chaney et al. |
| 5,666,645 A | | 9/1997 | Thomas et al. |
| 5,684,525 A | | 11/1997 | Klosterman |
| 5,729,687 A | * | 3/1998 | Rothrock et al. ............. 709/204 |
| 5,808,694 A | | 9/1998 | Usui et al. |
| 5,808,702 A | * | 9/1998 | Yoshinobu et al. ........... 348/731 |
| 5,828,945 A | | 10/1998 | Klosterman |
| 5,883,677 A | * | 3/1999 | Hofmann .................. 348/584 |
| 5,923,362 A | | 7/1999 | Klosterman |
| 6,072,983 A | | 6/2000 | Klosterman |
| 6,177,931 B1 | | 1/2001 | Alexander et al. |
| 6,449,767 B1 | | 9/2002 | Krapf et al. |
| 6,591,292 B1 | | 7/2003 | Morrison et al. |
| 7,444,661 B1 | | 10/2008 | Wugofski |
| 2007/0107019 A1 | | 5/2007 | Romano et al. |
| 2007/0157240 A1 | | 7/2007 | Walker |
| 2008/0229364 A1 | | 9/2008 | Ryu et al. |

FOREIGN PATENT DOCUMENTS

| | | |
|---|---|---|
| DE | 41 17 239 C2 | 12/1992 |
| DE | 42 01 031 AI | 7/1993 |
| DE | 42 17 246 A1 | 12/1993 |
| DE | 42 40 187 | 6/1994 |
| EP | 0337336 A2 | 10/1989 |
| EP | 0 444 496 AI | 9/1991 |
| EP | 0 477 756 A2 | 4/1992 |
| EP | 0 560 593 | 9/1993 |
| EP | 0 566 454 A1 | 10/1993 |
| JP | 61264430 | 11/1986 |
| JP | 62-60377 A | 3/1987 |
| JP | 64-041590 U | 2/1989 |
| JP | 1-160188 A | 6/1989 |
| JP | 3-6130 A | 1/1991 |
| JP | 3-22770 A | 1/1991 |
| JP | 4-185088 | 7/1992 |
| JP | 5-83688 | 4/1993 |
| WO | WO-90/07844 A1 | 7/1990 |
| WO | WO 92/03018 | 2/1992 |
| WO | WO-9204801 A1 | 3/1992 |
| WO | WO 94/14280 | 6/1994 |
| WO | WO 94/14281 | 6/1994 |
| WO | WO 94/14284 | 6/1994 |
| WO | WO-9421081 A2 | 9/1994 |
| WO | WO-9502945 A1 | 1/1995 |
| WO | WO-95/07003 A1 | 3/1995 |
| WO | WO 95/24098 | 9/1995 |
| WO | WO-9633572 A1 | 10/1996 |
| WO | WO-9935849 A1 | 7/1999 |

OTHER PUBLICATIONS

Hofmann, J., "The Consumer Electronic Bus: An Integrated Multi-Media LAN for the Home," International Journal of Digital and Analog Communication Systems, vol. 4, No. 2, 1991, pp. 77-86.

"IS-60.3 Physical Layer and Medium Specifications. Part 3-CX Physical Layer & Medium Specification," CX Specification, Revised Mar. 19, 1992, Table of Contents (2 pp.) and pp. 1-41.

O'Brien, Jr., T. E., "Physical and Media Specifications of the CXBus," IEEE Transactions on Consumer Electronics, vol. 37, No. 3, Aug. 1991, pp. 357-366.

Davidson, Ken, "CEBus: A New Standard in Home Automation," Circuit Cellar Ink, Aug./Sep. 1989; pp. 40-52.

Schaas, G., "In Gerat Fur Viele Standards", Funkschau, Weka Fachzeitschriften Verlag, Poing, De, No. 18, Aug. 25, 1989, pp. 124-128.

Cable Television Technology Book Description (no tranlasation available).

Instruction Guide for the Uniden UST-4800 Integrated Receiver/Descrambler.

Operating Guide for the Uniden UST-4800 Integrated Receiver/Descrambler.

Office Actions and Replies in U.S. Appl. No. 11/841,521 (ST-012 Cont. 5) filed Aug. 20, 2007

Office Actions and Replies in U.S. Appl. No. 10/441,475 (ST-012 Cont. 3) filed May 19, 2003.

Information Disclosure Statement submitted to the United States Patent and Trademark Office on Oct. 14, 1997 in U.S. Appl. No. 08/728,614.

RCA Satellite Receiver User's Manual, Thomson Multimedia Inc. (2001).

Starsight Operating System and quick reference (get full name from previous filings).

U.S. Appl. No. 08/402,943, filed Mar. 13, 1995 titled "Method and Apparatus for Managing Multiple Outside Video Service Providers".

Video Guide User's Manual, Copyright 1995.

* cited by examiner

MULTI-SOURCE SWITCHING IN A TELEVISION SYSTEM

This is a continuation application of U.S. patent application Ser. No. 10/441,475, filed on May 19, 2003, which is a continuation of U.S. patent application Ser. No. 09/612,352, now abandoned, filed on Jul. 6, 2000, now abandoned, which is a continuation application of U.S. patent application Ser. No. 08/810,199, filed on Mar. 3, 1997, now abandoned, which is a continuation application of U.S. patent application Ser. No. 08/423,410, filed on Apr. 17, 1995, now abandoned.

BACKGROUND OF THE INVENTION

The prior art includes several arrangements for presenting information associated with a television schedule guide. This information is often used to provide an on-screen grid-like display of the available channels along with their related television shows. Usually, a list of available channels are displayed on the y-axis and time slots occupy the x-axis. These listed channels can appear sequentially or in any preferred, predetermined order within the display on the television. U.S. Pat. No. 5,353,121 is representative of such systems, and has found wide success in the industry. U.S. Pat. No. 5,353,121 is hereby incorporated by reference.

Many different transmission schemes are available for providing the information required for a television schedule guide. For example, a Direct Broadcast Satellite System (DBS) can provide television programs and television program schedule information via a satellite dish in conjunction with a set-top receiver. DBS systems are commercially available from, for example, Hughes and Primestar. In addition, conventional satellite dishes, coax cable, telephone lines, fibre optic cable, antennae, etc. are used to distribute television program and/or program schedule information.

If DBS is subscribed to by a user, then a separate IRD (integrated receiving decoder) box with an on-screen display generator is usually provided. An IRD box usually includes a receiver and a tuner at the most basic level. A DBS subscriber receives access to potentially hundreds of television channels along with a program guide provided/controlled by the DBS service provider. Unfortunately, a DBS system normally does not receive local network or local independent channels. In order to provide these missing local channels, some DBS receivers are capable of automatically switching between the DBS satellite input and a local input. This is accomplished by placing the IRD box between the television (or a VCR connected to the television) and the local line (local cable or local antennae). When a local channel is selected by the user, the IRD box automatically removes DBS from service and becomes a bypass for the local input. A user can select a local channel either manually or with a remote control. Access to locally available channels is crucial because the majority of prime time viewing is on those local networks.

In contrast, if a user is receiving television channels from both cable and a local antenna sources, then the scenario is different. If the user's television has multiple television input ports, then these two sources can easily be attached to the two input ports. This solution works well as long as the number of sources does not become greater than the number of television input ports.

If the user's television does not have multiple inputs, then a manual switch box attached to the multiple sources and to the television input can be utilized. This solution forces the user to manually switch between one source and another depending on which channel is desired. For example, if the user wants the local news, which is available from the local antennae, and the switch is set to cable, then the user must manually switch from cable to the local antenna. In a society filled with remote controls and automation, this solution is unacceptable to many consumers. Moreover, manually switching between channels becomes more complicated as the number of channel sources is increased.

While the IRD box, multiple television input ports, manual switching unit, etc. provide non-automated and sometimes partial solutions to the above-described problems, a more versatile technique is needed.

SUMMARY OF THE INVENTION

In the preferred embodiment, the present invention is directed to coordinating input signals and program information, and more particularly to (1) coordinating television schedule guide information received from multiple sources, (2) automatically switching to a desired signal source, and (3) tuning to a desired television program. Thus, the present invention provides a tuning scheme which coordinates television schedule guide information. This information can be received from numerous sources. These sources include an incoming cable line (e.g., on a coax cable), satellite broadcasts, a dedicated telephone line (e.g., twisted pair), and any other medium capable of transmitting a signal.

The present invention provides a method of operating a television system. This method of operation includes the inputting and storing of system channel guide information. The system channel guide information is received from multiple television sources and includes a source identifier. When the user inputs a desired program, the source identifier is used to select the source associated with that desired program from the available television signal sources. The selected source is then tuned to the desired program.

These and other advantages will become apparent to those skilled in this art upon a reading of the following detailed description of the invention, which should be taken in conjunction with the accompanying drawings.

DESCRIPTION OF SPECIFIC EMBODIMENTS

Figure 1A:
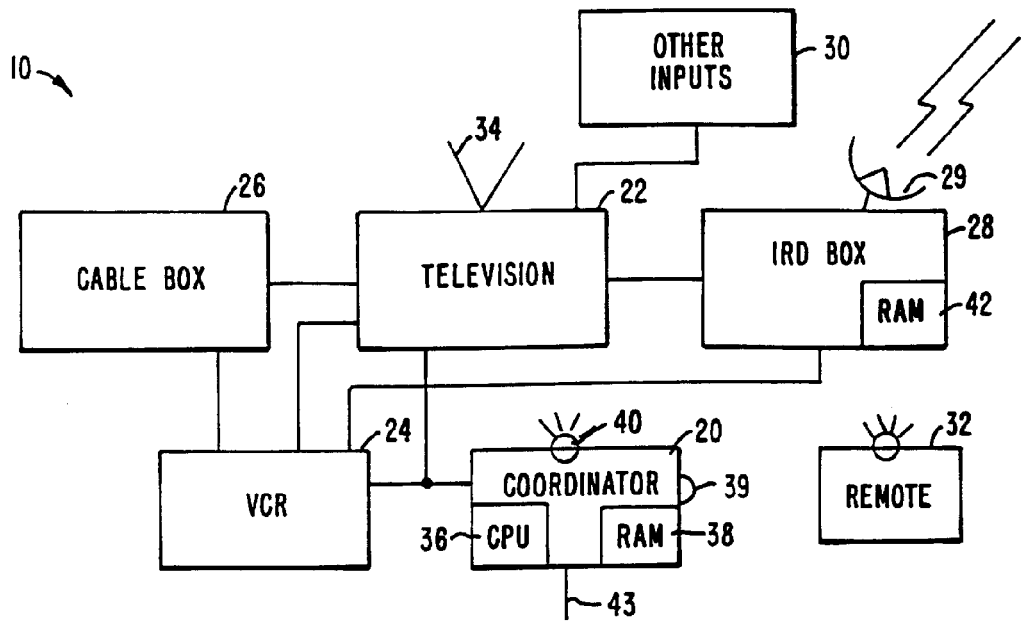
FIG. 1a is a block diagram of a multi-source television program and television schedule guide system with multiple sources connected directly to the television.

The present invention provides a tuning scheme which coordinates television programs and television schedule guide information. This television schedule guide information can be received from numerous sources. As stated above, these sources include an incoming cable line (e.g., on a coax cable), satellite broadcasts, a dedicated telephone line (e.g., twisted pair), and any other medium capable of transmitting a signal. In the preferred embodiment, television channel broadcasts are received from at least two separate sources such as (1) cable and a satellite dish, or (2) two different satellites, or (3) local cable and DBS sources. The schedule information is provided with a source identifier which identifies that schedule information as being from a particular source. The schedule information is sorted and displayed in an organized fashion to the user.

When a user selects a show or channel located on one of the displayed channels within a displayed guide, the system reads the source identifier associated with that show or channel. In the preferred embodiment, the system then carries out an automatic switching/tuning process that switches the input to the television (either RF or video) to a source device. Source devices include DBS, cable box, television tuner, etc. The system then tunes to the required channel for the desired show. Additionally, the source identifier can be utilized to switch between various devices automatically when unattended VCR programming is desired. Furthermore, when program information is received from multiple satellite sources and a desired channel is selected, the present invention can, in one embodiment, automatically move the customer's satellite dish such that the customer receives the desired program from the associated source. The present invention then tunes to the correct channel.

In creating a merged television guide, a channel map is created which identifies the channels available on the multiple sources, and identifies their source. For example, in the case of DBS/local channel implementations, a channel map is created with both local cable and DBS channels merged. The local channels and the DBS channels are tagged with a source identifier. When the user/consumer selects a non-DBS channel from the guide, the integrated receiver decoder unit (IRD box) for the satellite switches the IRD to couple the local cable to the receiver. The system then tunes the television tuner or other tuning device to the required channel. If a DBS channel is later selected, the system switches the IRD to couple the satellite receiver/decoder to the receiver. The system then tunes the DBS tuner to the selected DBS channel. In the case of, for example, cable and antenna inputs, the system switches to the correct video input and then tunes the television tuner to the required channel for receiving the selected source. Thus, automatic access to multi-source television schedule guide information is provided.

In another embodiment of the present invention, the user can utilize the system to switch between destination devices. For example, information/programs received from one of the multiple sources could be displayed on a computer screen or played on a stereo. Additionally, several destination devices can be used in conjunction with each other. For example, an FM radio station playlist could be shown on a computer monitor or television display, and the songs selected from that playlist could be later recorded on an audio recorder. Still further, the system could be used to couple audio TV outputs to a stereo system. Thus, the present invention is not limited to television systems.

FIG. 1a illustrates in simplified form an example of a multi-source television schedule guide system 10 with multiple sources connected directly to a television 22. As shown, multi-source television program and television schedule guide system 10 operates under the control of coordinator 20. Television 22 and VCR 24 are provided with input from cable box 26 and IRD box 28. Other inputs 30 may also be supplied to the television 22 and/or VCR 24. A remote control 32 is used by a viewer to tune the television and conduct other operations. In this embodiment, cable is provided via cable box 26, and DBS is provided via IRD box 28. Antennae 34 on television 22 may be used as an additional source of television broadcasts along with cable box 26, IRD box 28, and other inputs 30. In one typical embodiment, antenna 34 and cable box 26 are "local" sources. Other inputs 30 can include multiple satellite sources. When multiple satellite sources are present, coordinator 20 switches between the available satellite sources by automatically moving the user's satellite dish or switching between satellite dishes. In order to automatically move the satellite dish, a memory within IRD box 28 tracks the position of the DBS satellite dish in relation to satellite sources which are available via the DBS satellite dish. The IRD box 28 then automatically positions the DBS satellite dish such that the desired satellite source is received by the IRD box 28.

Coordinator 20 includes processor (CPU) 36 and memory (RAM) 38. The coordinator is connected to and controls infrared (IR) emitter(s) 40. IR receiver 39 is connected to coordinator 20 and receives input from the remote. IR emitter(s) 40 can be replaced by, for example, a bus interface or an RF transmitter. The IR emitter(s) 40 controls one or more of IRD box 28, television 22, VCR 24, cable box 26, and other inputs 30. Thus, IR emitter 40 acts as a remote control device by emulating remote control signals of television 22, VCR 24, cable box 26, and/or other devices. Because coordinator 20 has the ability to simulate a remote controller, coordinator 20 can be placed in the cable box 26, VCR 24, television 22, stand alone unit 20, or a satellite receiver.

Remote control 32 is a hand-held remote controller for controlling coordinator 20. In the preferred embodiment, remote control 32 is provided with an IR transmitter which controls the coordinator via IR receiver 39. Other remote controls, not shown in FIG. 1a, can be used for manually controlling television 22, VCR 24, cable box 26, IRD box 28, and other inputs 30. Although, in a preferred embodiment, coordinator 20 performs all the necessary control functions of the system. In a preferred embodiment, remote 32 works with coordinator 20 and emitter 40 to control the various devices in FIG. 1a. For example, as the user adjusts the volume control on remote 32, coordinator 20 emits signals through IR emitter 40 to adjust the volume in television 22.

IRD box 28 receives television programs along with other information via, in one embodiment, satellite dish 29. IRD box 28 then provides program schedule information to the system. The schedule information is added to the transmitted signal by the DBS service provider or a company under contract. Examples of DBS service providers include Direct TV and USSB. This program schedule information (or guide) may also include a channel map that contains the channel information which is available on a particular source. Information associated with the DBS guide is saved in the IRD box receiver's RAM 42 or downloaded. Similarly, program guide information can be received through cable box 26, other inputs 30, antennae 34, and/or through any other transmission medium (e.g., dedicated twisted pair telephone line). Each of these sources may also be provided with television schedule data within the signal transmitted by the service provider.

Coordinator 20 finds and sorts the program guide information available in system 10. In order to receive the required television guide information, coordinator 20 is connected to the source(s) of this information. For example, if the channel map information is provided by a dedicated twisted pair telephone line, then that telephone line is input 43 to coordinator 20. Guide information can be provided from any commercially available medium and can apply to all or several of the available sources. In the preferred embodiment, television guide information is provided via the vertical blanking interval on an available television channel. In FIG. 1a, the source devices along with coordinator 20 are coupled to television 22. Thus, coordinator 20 receives the program guide information via telephone line 43, and television 22 receives the television programs from the multiple sources. In addition, television 22 receives the program guide information from coordinator 20.

Figure 1B:
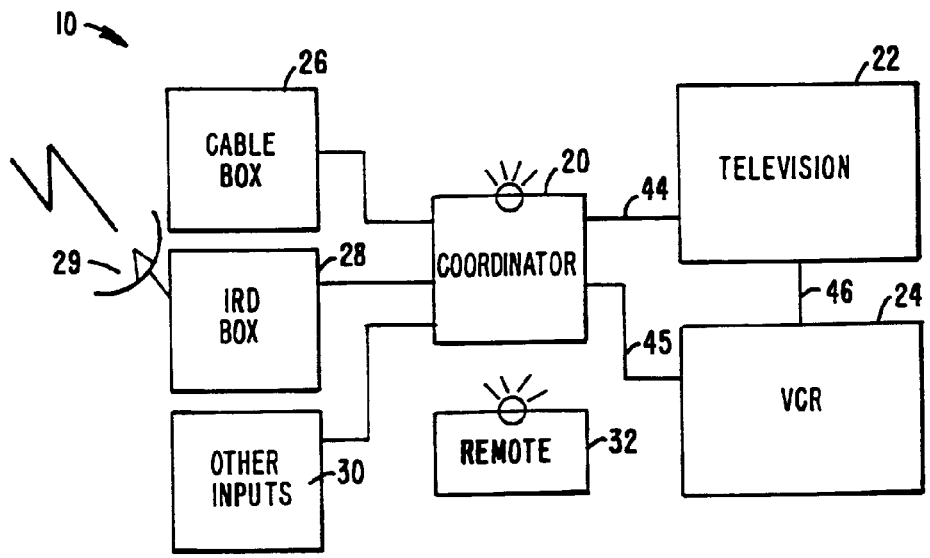
FIG. 1b is a block diagram of a multi-source television program and television schedule guide system with the multiple sources connected directly to the coordinator.

In another embodiment of the present invention, coordinator 20 receives all the source device inputs directly. FIG. 1b is a block diagram of a multi-source television program and television schedule guide system with the multiple sources connected directly to the coordinator. In this embodiment, coordinator 20 switches between the multiple sources 26, 28 and 30 and then outputs the information from the desired source to television 22 or to another destination device. This arrangement allows for a single input to television 22. Coordinator 20 inputs program guide information along with television programs to television 22 via line 44 or through VCR 24 via lines 45 and 46. Other possible destination devices for the present invention are computer monitors, audio recorders, facsimile machines, printers, memory, etc.

Figure 1C:
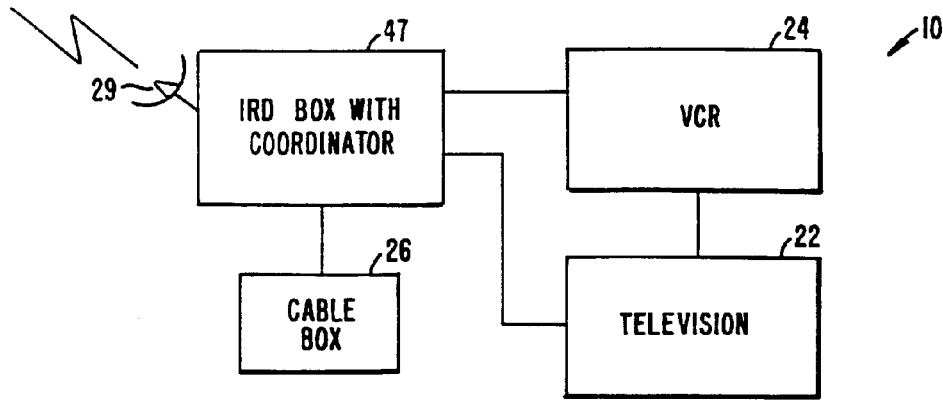
FIG. 1c is a block diagram of a television program and television schedule guide system with DBS and cable as source devices.

In yet another embodiment of the present invention, DBS (via IRD box 28) and cable (via cable box 26) are source devices which are connected in series to television 22. FIG. 1c is a block diagram of a television program and television schedule guide system with DBS and cable as source devices. In this arrangement, the coordinator is located within IRD box 47, and no IR emitter is needed. IRD box 47 inputs to television 22 directly or through VCR 24. When DBS is removed from service by the coordinator within IRD box 47, cable box 26 inputs to television 22.

Figure 1D:
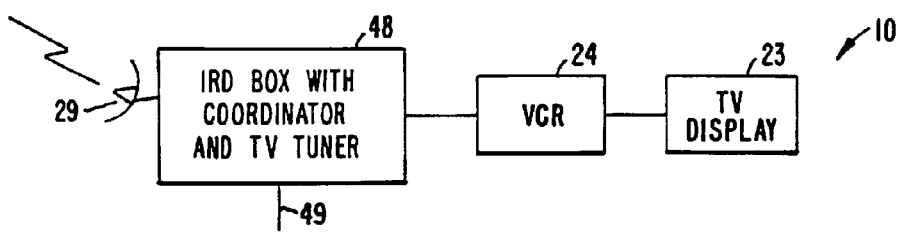
FIG. 1d is a block diagram of a television program and television guide system which has DBS, the coordinator, and the television tuner all within the same IRD box.

FIG. 1d is a block diagram of a television program and television guide system which has DBS, the coordinator, and the television tuner all within the same IRD box. In this additional embodiment, no cable source is present, and DBS, the coordinator and the television tuner are all located within IRD box 48. Thus, no emitter is needed. The coordinator switches between DBS and other available source(s) received on line 49. After the coordinator has switched and tuned to the desired channel, (as described below) that channel is displayed on television display 23 or recorded by VCR 24. The VCR set forth in FIGS. 1a-1d is optional. Additionally, the DBS receiver and tuner could be located within the television or the VCR.

Various formats can be used for the television schedule information. For example, data packets comprising a header section and information section can be received and sorted with other, more complex data packet formats. In the preferred embodiment, coordinator 20 takes the television schedule information from the available source(s) or a data input line and sorts/mixes it. For example, coordinator 20 may receive program schedule information via the vertical blanking interval in a television channel or via a transponder of DBS.

In order to sort/mix the available schedule information, coordinator 20 first creates a structured framework and then saves the received data in that structured framework. This structure framework includes several levels for organized data storage. After the levels of the framework are prepared by coordinator 20, pointers are utilized to save data within appropriate levels of the structure.

In an alternative arrangement, the sorting/mixing of program schedule information is done in a separate location and then provided to system 10, for example, on a satellite channel. Thus, program schedule information, which has already been mixed, sorted, organized, etc., is received in a format which is ready for immediate display. Less memory is required within the coordinator in this latter situation because only the screen/grid being viewed needs to be saved. For example, in this latter situation, if a user wishes to view a grid guide which is four hours long, only four hours worth of information needs to be saved within RAM 38. This ready-for-immediate-display format can also be provided in a separate data stream via a different medium or on a television channel.

Figure 2:
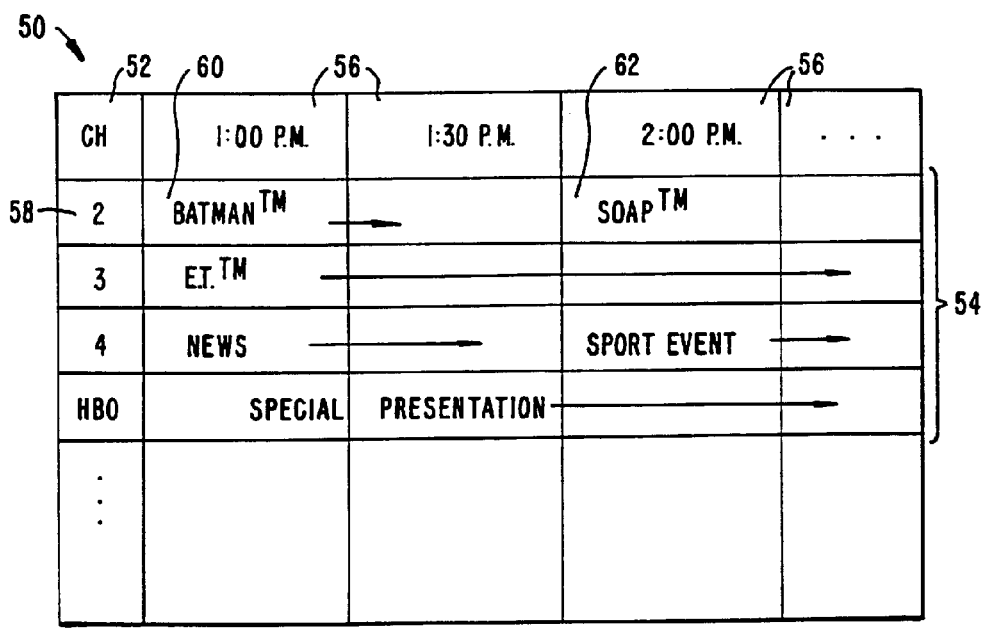
FIG. 2 is an example of an on-screen display of a schedule grid guide that has been assembled from the television guide information.

FIG. 2 is an example of an on-screen display of a schedule grid guide that has been assembled from the television guide information. The grid guide of the present invention also refers to and includes theme guides, channel guides, and other guides which display program information. In the preferred embodiment, after coordinator 20 has collected and sorted all the available program guide information, coordinator 20 generates the grid guide set forth in FIG. 2 for display on television 22. This grid guide can also be generated within the IRD box, a satellite receiver, the television, the VCR, a central office location, etc. The grid guide, designated generally with the reference numeral 50, provides a line up of all channels or a selection of channels 52 along with a description of the shows 54 available on those channels at certain times 56. For example, channel 2 58 has BATMAN 60 as a show from 1:00 p.m. to 2:00 p.m. and SOAP 62 as a show from 2:00 p.m. to 2:30 p.m. A theme, or channel, or random, etc. listing can be used instead of the grid guide shown in FIG. 2.

If a grid guide is used, the lineup of channels 52 can be arranged such that (1) channels are in numerical and/or alphabetical order, or (2) channels are in an order associated with their particular source, or (3) channels are in a mixed order programmed by a user, or (4) channels are in any other arrangement. When multiple sources are used for receiving television channels, an overlap of channels sometimes occurs. For example, both cable and DBS may carry the network ABC, but cable may have ABC on channel 6 and DBS may have ABC on channel 7. By having the ability to delete and activate the channels displayed in grid guide 50, the user can determine whether to have one of the ABC channels, both of the ABC channels, or neither of the ABC channels. The user's choice is entered into coordinator 20 via remote control 32. In an alternative embodiment, coordinator 20 may automatically note duplicate network names and delete one of the duplicates. In addition, coordinator 20 is capable of automatically lining up channels based on user's habits. If this mode for the automatic arrangement of channels is selected by the user, an algorithm based on user habits is used to determine the channel order 52. Therefore, any desired arrangement for the lineup of channels 52 is available.

In the preferred embodiment, the user displays grid guide 50 by pressing a guide button on remote control 32. Coordinator 20 responds to the initial pressing of the guide button by automatically tuning to the channel or device which carries grid guide 50, or overlaying a grid guide in a current broadcast. When the user is done with grid guide 50, the user presses the guide button again (or an exit button) and coordinator 20 (1) automatically returns to the channel or source last viewed by the user or (2) removes the overlay. The technique utilized by coordinator 20 for automatic tuning is described further below.

In order to track which channels are available from which sources, a source identifier is located on each channel. Each of the source identifiers may be included in the channel guide information, or the source identifiers may be added by the system based on the origin of the channel guide information. Therefore, if these data are not already provided, coordinator 20 attaches the appropriate identifiers to the received channel guide information. For example, if BATMAN 60 is received through IRD box 28, than BATMAN 60 will have a source identifier for identifying the IRD box 28 located on its channel 58. In the preferred embodiment, the source identifier is not displayed to the user. If desired, the user can program coordinator 20 to display which source the channel is associated with. For example, channels which come from cable box 26 can be colored red in grid guide 50 and channels available from IRD box 28 can be the color green; thus, if desired, the user can easily identify which source is associated with each channel.

Remote 32 can be utilized by the user to program coordinator 20 or to move between different channels, times and shows in grid guide 50. Moreover, remote control 32 can be used to select a certain channel or show (1) for displaying additional information associated with a particular show, (2) for tuning to a particular channel or show, or (3) for automatically recording a particular show. Remote control 32 can also be used for adjusting the volume or other features of television 22 or other devices. The additional information associated with a particular show may include a short description of that show. For example, a short description of the story included in a sitcom may be provided. To display this additional information, coordinator 20 accesses the desired information in RAM 38 or switches to a different input of data, and displays the additional information in an appropriate place within grid guide 50. In the preferred embodiment, this additional information is displayed (1) in an overlay, or (2) as a pull down window under the selected show, or (3) as a defined information window at the top or the bottom of the screen.

Figure 3:
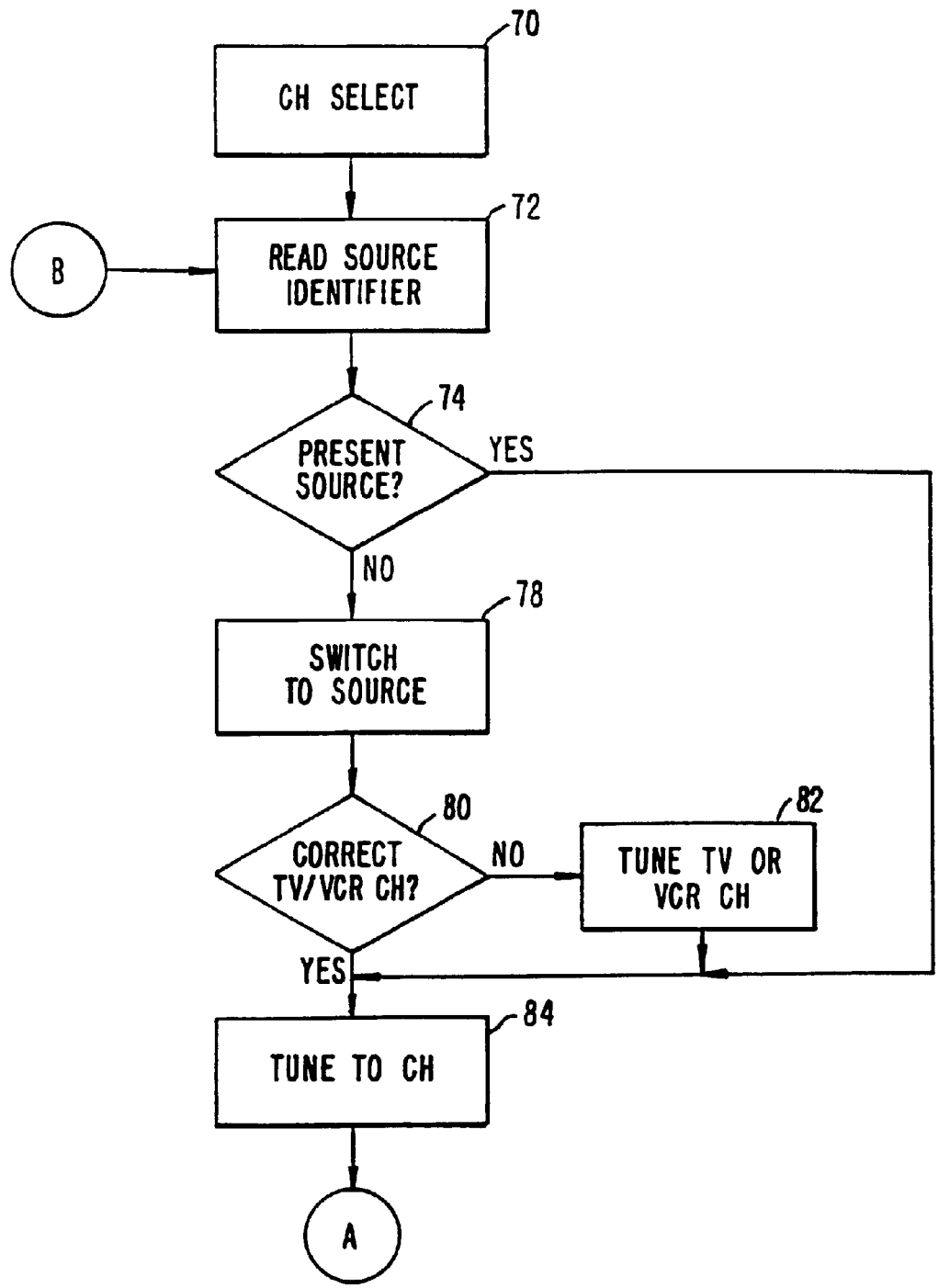
FIG. 3 is an exemplary process flow chart for automatic tuning.

FIG. 3 is an exemplary process flow chart for automatic tuning. To begin automatic tuning, the user selects a certain channel or show at step 70. The selection may be made by, for example, scrolling a cursor to a desired show and striking the "enter" key, or entering a channel number using remote 32. Coordinator 20 then reads the source identifier at step 72 and determines if the present input to television 22 is the source associated with the source identifier (see step 74). If the present input source to television 22 is the same as the source associated with the source identifier, then coordinator 20 tunes that particular source to the desired channel at step 84. If the present source is not the source associated with the source identifier, then the system switches sources to the proper source. For example, processor 36 may cause IR emitter 40 to send out a signal which switches from the present source, and which activates or switches to the source associated with the source identifier. The desired channel or show then serves as the source inputting information to television 22. Coordinator 20 then determines if the correct television channel or input for that particular source (the source associated with the source identifier) is activated at step 80. If the correct television channel or input is not activated, then the appropriate tuner in the system is tuned to the proper channel. For example, IR emitter 40 may be used to tune the television to the desired television channel at step 82. Alternatively, step 80 could be removed, and coordinator 20 would then always tune or re-tune to the required channel, thereby confirming that television 22 is on the correct channel. After (or simultaneous with) the activation of the correct television channel or input associated with the desired source, IR emitter 40 tunes the receiver in that source to the desired channel at step 84. The desired broadcast is then displayed on television 22. If a program is input to television 22 and/or VCR 24 via coordinator 20 (see FIG. 1b), then no tuning is needed for the television and/or VCR. Therefore, in this latter arrangement, steps 80 and 82 are not present.

To further illustrate the process set forth in FIG. 3, the following example is provided. In this example, IRD box 28 has channels 100-200 available and is presently the input source to television 22 (see FIG. 1c). Additionally, cable box 26 is an input to IRD box 28 (see FIG. 1c). A user selects BATMAN 60 on channel 2 58 at step 70. The selected show is available on a channel from cable box 26. Coordinator 20 reads the source identifier associated with the selected show and determines that channel 2 is from cable box 26 at step 72. Coordinator 20 then determines that the present source is IRD box 28 at step 74. Therefore, a switching of sources must occur. As set forth above, when DBS is no longer the selected source, IRD box 28 allows cable box 26 to send signals through an internal relay (electronic or mechanical) within IRD box 28 to television 22. Therefore, coordinator 20 utilizes IR emitter 40 to deactivate or decouple DBS at step 78. IRD box 28 is inputted to television 22 through channel 3 of television 22. In the present arrangement, cable box 26 is also connected through channel 3 of television 22. Coordinator 20 may then check television 22 to ensure that it is on channel 3, as required for input from cable box 26 (see step 80). Since television 22 is already on channel 3, no change is made to the television channel (see step 84). Coordinator 20 then utilizes IR emitter 40 to tune cable box 26 to the desired channel 2 at step 84. As stated above, step 82 and step 84 can occur simultaneously. The program on is then displayed on television 22, and the process set forth in FIG. 3 is complete. In other embodiments, the television tuner will be used to select from numerous inputs from the sources, or a mixed system may provide that the television tuner is used for some sources, and the source tuner is used for other sources.

Figure 4:
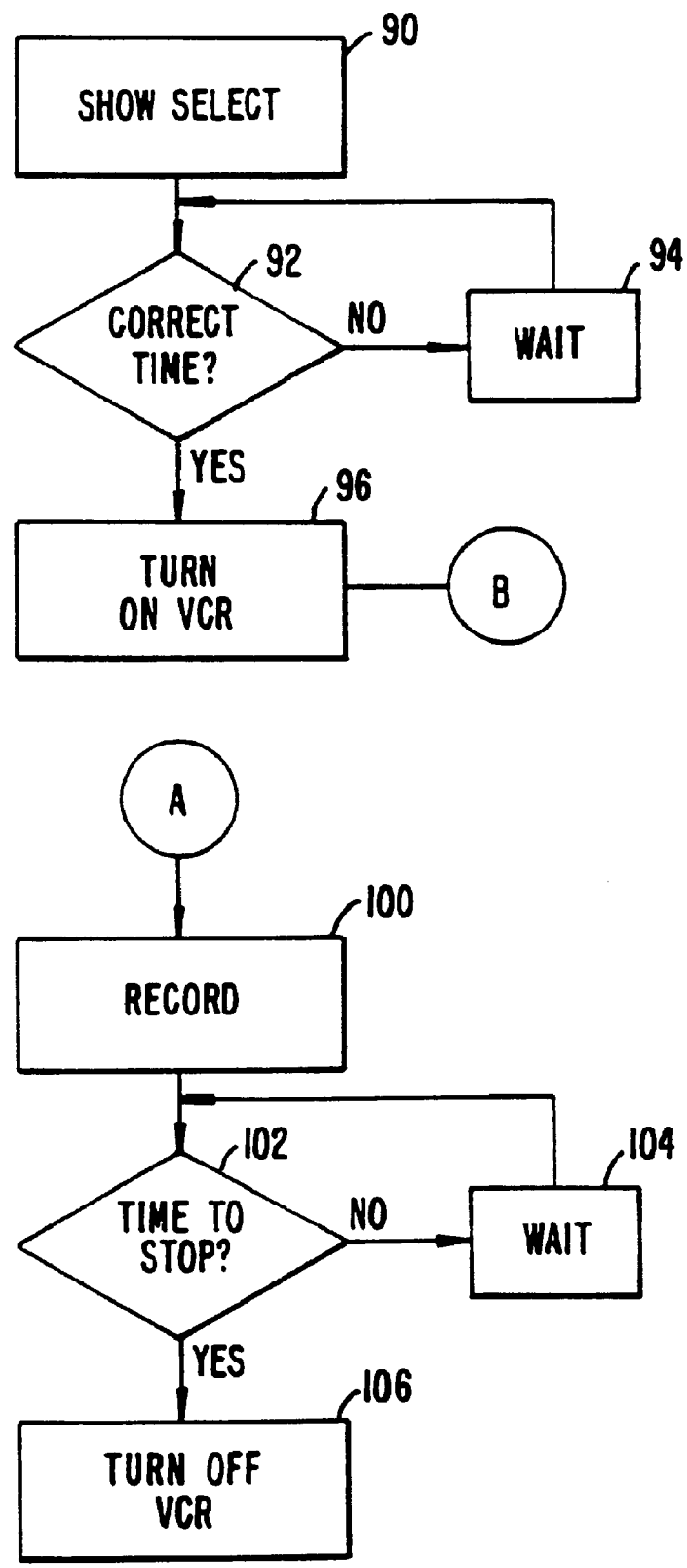
FIG. 4 is an exemplary process flow chart for automatic, unattended recording.

FIG. 4 is an exemplary process flow chart for automatic, unattended recording. To begin automatic, unattended recording, the user selects a television show for recording with remote 32. In order to provide the automatic recording of the selected program, VCR 24 is automatically turned "on" (along with the activation of the VCR's record feature) at the appropriate time and then turned "off" when the show is complete. The tuning process used for automatic recording is the same as the process set forth for automatic tuning (see FIG. 3), but the VCR is tuned to the correct channel rather than the television.

As set forth in FIG. 4, after the user selects a show at step 90, the coordinator checks to see if the beginning time for that show has passed (see step 92). If the beginning time has not passed, coordinator 20 waits at step 94. When the correct time (the program's starting time) does occur, VCR 24 is turned "on" (see step 96) and coordinator 20 acts as though automatic tuning has occurred. Therefore coordinator 20 reads the source identifier associated with the channel providing the selected show at step 72 (see FIG. 3). This transition between the process flow for automatic recording and the process flow for automatic tuning is indicated by B. During the tuning sequence for automatic recording, the VCR, rather than the television, is tuned to the correct channel (see steps 80 and 82). When the process flow set forth in FIG. 3 is complete, as indicated by A, coordinator 20 utilizes IR emitter 40 to activate the recording feature of the VCR at step 100 in FIG. 4. This causes VCR 24 to record the selected program. Coordinator 20 then checks to see if the end time of the show matches the present time at step 102. If the show is not over, coordinator 20 waits at step 104. When the end time for the show matches the present time, IR emitter 40 stops recording the show and then turns "off" the VCR at step 106. This scheme allows for the unattended, automatic recording of any show available from any source coupled to VCR 24.

In another embodiment of the present invention, coordinator 20 is located within IRD box 28, and coordinator 20 handles the switching and tuning required for DBS and cable sources without utilizing an IR emitter. When the user/consumer selects a non-DBS channel from the guide, the coordinator switches from the integrated receiver decoder unit for the satellite to the cable (if the source is originally DBS), and proceeds to tune the television tuner, or television tuner and cable box to the required channel. If a DBS channel is later selected, the system switches back to the integrated receiver decoder unit and tunes to the required DBS channel. This arrangement allows for the coordinating of multi-sources without the need for an IR emitter.

With the assistance of coordinator 20, a user does not have to manually select a television program source or manually tune to a desired channel or program. Moreover, with the automatic receiving, grid guide generating, switching, and tuning available in system 10, there is little if any manual interaction from the end user or customer.

While a full and complete disclosure of the invention has been provided herein above, it will be obvious to those skilled in the art that various modifications and changes may be made.

What is claimed is:

1. A method for providing channel guide information listings, the method comprising:
   receiving, using processing circuitry, channel guide information listings, the received listings include channel guide information corresponding to at least two program sources, each program source operative to transmit a plurality of television channels;
   storing, using processing circuitry, a channel guide having program listings for the plurality of television channels, the channel guide includes the channel guide information corresponding to the at least two program sources, wherein the processing circuitry is configured to receive:
      a first program corresponding to a first one of the program listings, that corresponds to a first of the at least two sources, from the first source, and
      a second program corresponding to a second one of the program listings, that corresponds to a second of the at least two sources, from the second source; and
   simultaneously displaying, on a display device, at least some of the listings and a representation of each of the at least two program sources.

2. The method of claim 1 wherein the channel guide information listings are received from a single data source.

3. The method of claim 1 wherein:
   the channel guide information listings corresponding to a first program source of the at least two program sources are received from the first program source; and
   the channel guide information listings corresponding to a second program source of the at least two program sources are received from the second program source.

4. The method of claim 1 further comprising:
   merging the channel guide information to form the channel guide which includes the channel guide information corresponding to the least two sources.

5. The method of claim 1 further comprising:
   mixing and sorting the channel guide information received from the at least two sources in a desired order; and
   generating a display with the channel guide information presented in the desired order.

6. The method of claim 1, wherein said storing further comprises:
   automatically deleting duplicate listings from the channel guide.

7. The method of claim 1, further comprising:
   storing a signal source identifier for each program listing, each identifier identifying the transmission scheme of one of the at least two sources.

8. The method of claim 1 further comprising:
   receiving from a user a program selection from the displayed listing;
   retrieving a signal source identifier that corresponds to source of the program selection; and
   coupling the input of a user equipment device to a television signal from the source that corresponds to the retrieved source identifier.

9. The method of claim 1, wherein the sources are selected from the group consisting of a cable, a broadcast source, an antenna source, a terrestrial source, a satellite source, and a direct broadcast satellite source.

10. The method of claim 1 further comprising:
    identifying the source of a displayed listing.

11. The method of claim 10 wherein identifying the source includes a source identifier in a first color that corresponds to a listing associated with a first of the at least two sources, and a source identifier in a second color that corresponds to a listing associated with a second of the at least two sources.

12. The method of claim 1 further comprising:
    displaying at least some of the listings that correspond to a first of the at least two program sources; and
    displaying, in response to a user input, at least some of the listings that correspond to a second of the at least two sources.

13. The method of claim 1, wherein a transmission scheme of the source is terrestrial or satellite.

14. The method of claim 1 further comprising simultaneously displaying listings from the at least two sources.

15. A system for use in providing channel guide information listings, the system comprising:
    processing circuitry configured to:
       receive channel guide information listings, the received listings include channel guide information corresponding to at least two program sources, each program source operative to transmit a plurality of television channels;
       store a channel guide having program listings for the plurality of television channels, the channel guide includes the channel guide information corresponding to the at least two program sources; and
       receive:
          a first program corresponding to a first one of the program listings, that corresponds to a first of the at least two sources, from the first source, and
          a second program corresponding to a second one of the program listings, that corresponds to a second of the at least two sources, from the second source; and
    a display configured to simultaneously display at least some of the listings and a representation of each of the at least two program sources.

16. The system of claim 15 wherein the channel guide information listings are received from a single data source.

17. The system of claim 15 wherein:
    the channel guide information listings corresponding to a first program source of the at least two program sources are received from the first program source; and
    the channel guide information listings corresponding to a second program source of the at least two program sources are received from the second program source.

18. The system of claim 15, wherein the processing circuitry is further configured to:

merge the channel guide information to form the channel guide which includes the channel guide information corresponding to the least two sources.

19. The system of claim 15, wherein the processing circuitry is further configured to:
mix and sort the channel guide information received from the at least two sources in a desired order; and
generate a display with the channel guide information presented in the desired order.

20. The system of claim 15, wherein the processing circuitry is further configured to:
automatically delete duplicate listings from the channel guide.

21. The system of claim 15, wherein the processing circuitry is further configured to:
store a signal source identifier for each program listing, each identifier identifying the transmission scheme of one of the at least two sources.

22. The system of claim 15, wherein the processing circuitry is further configured to:
receive from a user a program selection from the displayed listing;
retrieve a signal source identifier that corresponds to source of the program selection; and
couple the input of a user equipment device to a television signal from the source that corresponds to the retrieved source identifier.

23. The system of claim 15, wherein the sources are selected from the group consisting of a cable, a broadcast source, an antenna source, a terrestrial source, a satellite source, and a direct broadcast satellite source.

24. The system of claim 15, wherein the processing circuitry is further configured to:
identify the source of a displayed listing.

25. The system of claim 24 wherein identifying the source includes a source identifier in a first color that corresponds to a listing associated with a first of the at least two sources, and a source identifier in a second color that corresponds to a listing associated with a second of the at least two sources.

26. The system of claim 15, wherein the display is further configured to:
display at least some of the listings that correspond to a first of the at least two program sources; and
display, in response to a user input, at least some of the listings that correspond to a second of the at least two sources.

27. The system of claim 15, wherein a transmission scheme of the source is terrestrial or satellite.

28. The system of claim 15, wherein the display is further configured to:
simultaneously display listings from the at least two sources.

29. A method for providing program guide information listings, the method comprising:
receiving, using processing circuitry, program guide information listings, wherein the received listings include program guide information corresponding to at least two program sources, wherein each program source is operative to simultaneously transmit a plurality of programs;
storing, using processing circuitry, a program guide having program listings for the plurality of programs, wherein the program guide includes the program guide information corresponding to the at least two program sources, wherein the processing circuitry is configured to receive:
a first program corresponding to a first one of the program listings, that corresponds to a first of the at least two sources, from the first source, and
a second program corresponding to a second one of the program listings, that corresponds to a second of the at least two sources, from the second source; and
simultaneously displaying, on a display device, at least some of the listings and a representation of each of the at least two program sources.

30. The method of claim 29, wherein:
the program guide information listings corresponding to a first program source of the at least two program sources are received from the first program source; and
the program guide information listings corresponding to a second program source of the at least two program sources are received from the second program source.

31. The method of claim 29, further comprising:
merging the program guide information to form the program guide which includes the program guide information corresponding to the least two sources.

32. The method of claim 29, further comprising:
displaying at least some of the listings that correspond to a first of the at least two program sources; and
displaying, in response to a user input, at least some of the listings that correspond to a second of the at least two sources.

33. A system for use in providing program guide information listings, the system comprising:
processing circuitry configured to:
receive program guide information listings, wherein the received listings include program guide information corresponding to at least two program sources, wherein each program source is operative to simultaneously transmit a plurality of programs;
store a program guide having program listings for the plurality of programs, wherein the program guide includes the program guide information corresponding to the at least two program sources; and
receive:
a first program corresponding to a first one of the program listings, that corresponds to a first of the at least two sources, from the first source, and
a second program corresponding to a second one of the program listings, that corresponds to a second of the at least two sources, from the second source; and
a display configured to simultaneously display at least some of the listings and a representation of each of the at least two program sources.

34. The system of claim 33, wherein:
the program guide information listings corresponding to a first program source of the at least two program sources are received from the first program source; and
the program guide information listings corresponding to a second program source of the at least two program sources are received from the second program source.

35. The system of claim 33, wherein the processing circuitry is further configured to:
merge the program guide information to form the program guide which includes the program guide information corresponding to the least two sources.

36. The system of claim 33, wherein the display is further configured to:
display at least some of the listings that correspond to a first of the at least two program sources; and
display, in response to a user input, at least some of the listings that correspond to a second of the at least two sources.

* * * * *

UNITED STATES PATENT AND TRADEMARK OFFICE
CERTIFICATE OF CORRECTION

| | | |
|---|---|---|
| PATENT NO. | : 8,266,655 B2 | Page 1 of 1 |
| APPLICATION NO. | : 11/841520 | |
| DATED | : September 11, 2012 | |
| INVENTOR(S) | : Brian Lee Klosterman | |

It is certified that error appears in the above-identified patent and that said Letters Patent is hereby corrected as shown below:

In the Claims:

In Claim 18, column 11, line 3, please change "the least" with -- the at least --;

In Claim 31, column 12, line 17, please change "the least" with -- the at least --; and In Claim 48, column 12, line 58, please change "the least" with -- the at least --.

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

Page 1 of 1

PATENT NO. : 8,266,655 B2
APPLICATION NO. : 11/841520
DATED : September 11, 2012
INVENTOR(S) : York et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 871 days.

Signed and Sealed this
Seventeenth Day of March, 2020

Andrei Iancu
*Director of the United States Patent and Trademark Office*

(12) EX PARTE REEXAMINATION CERTIFICATE (10795th)
United States Patent
Klosterman

(10) Number: US 8,266,655 C1
(45) Certificate Issued: Jan. 14, 2016

(54) MULTI-SOURCE SWITCHING IN A TELEVISION SYSTEM

(75) Inventor: Brian Lee Klosterman, San Ramon, CA (US)

(73) Assignee: MORGAN STANLEY SENIOR FUNDING, INC., Baltimore, MD (US)

Reexamination Request:
No. 90/013,357, Sep. 30, 2014

Reexamination Certificate for:
Patent No.: 8,266,655
Issued: Sep. 11, 2012
Appl. No.: 11/841,520
Filed: Aug. 20, 2007

Certificate of Correction issued Jan. 1, 2013

Related U.S. Application Data

(63) Continuation of application No. 10/441,475, filed on May 19, 2003, now Pat. No. 8,539,528, which is a continuation of application No. 09/612,352, filed on Jul. 6, 2000, now abandoned, which is a continuation of application No. 08/810,199, filed on Mar. 3, 1997, now abandoned, which is a continuation of application No. 08/423,410, filed on Apr. 17, 1995, now abandoned.

(51) Int. Cl.
| | | |
|---|---|---|
| H04N 5/445 | (2011.01) |
| H04N 21/462 | (2011.01) |
| H04N 7/16 | (2011.01) |
| H04N 21/434 | (2011.01) |
| H04N 21/472 | (2011.01) |
| H04N 21/482 | (2011.01) |
| H04N 21/84 | (2011.01) |
| H04N 5/50 | (2006.01) |

(52) U.S. Cl.
CPC ............ *H04N 5/44543* (2013.01); *H04N 7/163* (2013.01); *H04N 21/4345* (2013.01); *H04N 21/4622* (2013.01); *H04N 21/47214* (2013.01); *H04N 21/482* (2013.01); *H04N 21/4821* (2013.01); *H04N 21/84* (2013.01); *H04N 5/505* (2013.01); *H04N 2005/44517* (2013.01)

(58) Field of Classification Search
CPC ..... H04N 5/44504; H04N 5/782; H04N 7/08; H04N 7/17318
USPC .................. 348/473, 569; 386/291; 725/133
See application file for complete search history.

(56) References Cited

To view the complete listing of prior art documents cited during the proceeding for Reexamination Control Number 90/013,357, please refer to the USPTO's public Patent Application Information Retrieval (PAIR) system under the Display References tab.

*Primary Examiner* — Christopher E. Lee

(57) ABSTRACT

The present invention provides a tuning scheme for coordinating schedule information and programs received from multiple sources (26, 28, 30 and 34). In the preferred embodiment, an identifier associated with the program's channel (52) is used to identify a source device (26, 28, 30 or 34). When a user selects a program (60 or 62) listed in displayed schedule information (50), the system (10) reads the source identifier attached to the program's channel (52). The system (10) then carries out an automatic switching/tuning such that the required source device (26, 28, 30 or 34) is input to the destination device (22), and a tuner is then tuned to the selected program's channel (52).

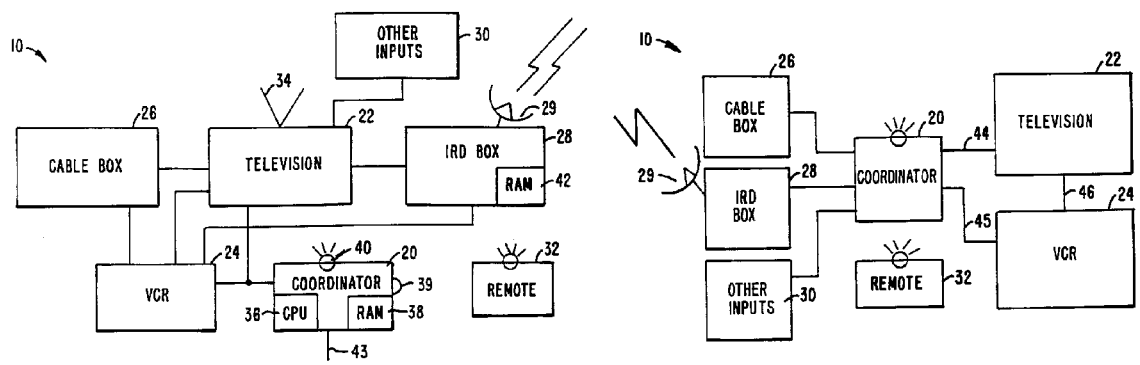

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 15, 22, 29 and 33 are determined to be patentable as amended.

Claims 2-7, 9-14, 16-21, 23-28, 30-32 and 34-36, dependent on an amended claim, are determined to be patentable.

New claims 37-98 are added and determined to be patentable.

1. A method for providing channel guide information listings, the method comprising:
   receiving, using processing circuitry *in a user device*, channel guide information listings, the received listings include channel guide information corresponding to at least two program sources, each program source operative to transmit a plurality of television channels;
   storing, using *the* processing circuitry, a channel guide having program listings for the plurality of television channels, the channel guide includes the channel guide information corresponding to the at least two program sources, wherein the processing circuitry is configured to receive:
      a first program corresponding to a first one of the program listings, that corresponds to a first of the at least two sources, *using a first receiver of the user device* from the first source, and
      a second program corresponding to a second one of the program listings, that corresponds to a second of the at least two sources, *using a second receiver of the user device* from the second source; and
   simultaneously displaying, on a display device, at least some of the listings and a representation of each of the at least two program sources.

8. The method of claim 1 further comprising:
   receiving from a user a program selection from the displayed [listing] *listings*;
   retrieving a signal source identifier that corresponds to source of the program selection; and
   coupling the input of a user equipment device to a television signal from the source that corresponds to the retrieved source identifier.

15. A system for use in providing channel guide information listings, the system comprising:
   processing circuitry *in a user device* configured to:
      receive channel guide information listings, the received listings include channel guide information corresponding to at least two program sources, each program source operative to transmit a plurality of television channels;
      store a channel guide having program listings for the plurality of television channels, the channel guide includes the channel guide information corresponding to the at least two program sources; and
      receive:
         a first program corresponding to a first one of the program listings, that corresponds to a first of the at least two sources, *using a first receiver of the user device* from the first source, and
         a second program corresponding to a second one of the program listings, that corresponds to a second of the at least two sources, *using a second receiver of the user device* from the second source; and
   a display configured to simultaneously display at least some of the listings and a representation of each of the at least two program sources.

22. The system of claim 15, wherein the processing circuitry is further configured to:
   receive from a user a program selection from the displayed [listing] *listings*;
   retrieve a signal source identifier that corresponds to source of the program selection; and
   couple the input of a user equipment device to a television signal from the source that corresponds to the retrieved source identifier.

29. A method for providing program guide information listings, the method comprising:
   receiving, using processing circuitry *in a user device*, program guide information listings, wherein the received listings include program guide information corresponding to at least two program sources, wherein each program source is operative to simultaneously transmit a plurality of programs;
   storing, using *the* processing circuitry, a program guide having program listings for the plurality of programs, wherein the program guide includes the program guide information corresponding to the at least two program sources, wherein the processing circuitry is configured to receive:
      a first program corresponding to a first one of the program listings, that corresponds to a first of the at least two sources, *using a first receiver of the user device* from the first source, and
      a second program corresponding to a second one of the program listings, that corresponds to a second of the at least two sources, *using a second receiver of the user device* from the second source; and
   simultaneously displaying, on a display device, at least some of the listings and a representation of each of the at least two program sources.

33. A system for use in providing program guide information listings, the system comprising:
   processing circuitry *in a user device* configured to:
      receive program guide information listings, wherein the received listings include program guide information corresponding to at least two program sources, wherein each program source is operative to simultaneously transmit a plurality of programs;
      store a program guide having program listings for the plurality of programs, wherein the program guide includes the program guide information corresponding to the at least two program sources; and
      receive:
         a first program corresponding to a first one of the program listings, that corresponds to a first of the at least two sources, *using a first receiver of the user device* from the first source, and
         a second program corresponding to a second one of the program listings, that corresponds to a second of the at least two sources, *using a second receiver of the user device* from the second source; and a display configured to simultaneously display at least some of the listings and a representation of each of the at least two program sources.

37. The method of claim 1, wherein the first receiver includes a first tuner and the second receiver includes a second tuner, and further comprising:
receiving a user selection of one of the displayed listings;
in response to receiving the user selection, selecting one of the first tuner and the second tuner, wherein:
the first tuner is selected when the selected program listing is the first program listing corresponding to the first program; and
the second tuner is selected when the selected program listing is the second program listing corresponding to the second program; and
accessing the program corresponding to the selected program listing using the selected tuner.

38. The method of claim 1, further comprising switching an input of the processing circuitry from the first source to the second source.

39. The method of claim 1, further comprising:
disconnecting an input of the processing circuitry from the first source; and
connecting the input of the processing circuitry to the second source.

40. The method of claim 1, further comprising receiving the first program from the first source independently of the second source.

41. The method of claim 1, further comprising receiving the first program directly from the first source and the second program directly from the second source.

42. The system of claim 15, wherein the first receiver includes a first tuner and the second receiver includes a second tuner, and wherein the processing circuitry is further configured to:
receive a user selection of one of the displayed listings;
in response to receiving the user selection, select one of the first tuner and the second tuner, wherein:
the first tuner is selected when the selected program listing is the first program listing corresponding to the first program; and
the second tuner is selected when the selected program listing is the second program listing corresponding to the second program; and
access the program corresponding to the selected program listing using the selected tuner.

43. The system of claim 15, wherein the processing circuitry is further configured to switch an input of the processing circuitry from the first source to the second source.

44. The system of claim 15, wherein the processing circuitry is further configured to:
disconnect an input of the processing circuitry from the first source; and
connect the input of the processing circuitry to the second source.

45. The system of claim 15, wherein the processing circuitry is further configured to receive the first program from the first source independently of the second source.

46. The system of claim 15, wherein the processing circuitry is further configured to receive the first program directly from the first source and the second program directly from the second source.

47. The method of claim 29, wherein the first receiver includes a first tuner and the second receiver includes a second tuner, and further comprising:
receiving a user selection of one of the displayed listings;
in response to receiving the user selection, selecting one of the first tuner and the second tuner, wherein:
the first tuner is selected when the selected program listing is the first program listing corresponding to the first program; and
the second tuner is selected when the selected program listing is the second program listing corresponding to the second program; and
accessing the program corresponding to the selected program listing using the selected tuner.

48. The method of claim 29, further comprising switching an input of the processing circuitry from the first source to the second source.

49. The method of claim 29, further comprising:
disconnecting an input of the processing circuitry from the first source; and
connecting the input of the processing circuitry to the second source.

50. The method of claim 29, further comprising receiving the first program from the first source independently of the second source.

51. The method of claim 29, further comprising receiving the first program directly from the first source and the second program directly from the second source.

52. The system of claim 33, wherein the first receiver includes a first tuner and the second receiver includes a second tuner, and wherein the processing circuitry is further configured to:
receive a user selection of one of the displayed listings;
in response to receiving the user selection, select one of the first tuner and the second tuner, wherein:
the first tuner is selected when the selected program listing is the first program listing corresponding to the first program; and
the second tuner is selected when the selected program listing is the second program listing corresponding to the second program; and
access the program corresponding to the selected program listing using the selected tuner.

53. The system of claim 33, wherein the processing circuitry is further configured to switch an input of the processing circuitry from the first source to the second source.

54. The system of claim 33, wherein the processing circuitry is further configured to:
disconnect an input of the processing circuitry from the first source; and
connect the input of the processing circuitry to the second source.

55. The system of claim 33, wherein the processing circuitry is further configured to receive the first program from the first source independently of the second source.

56. The system of claim 33, wherein the processing circuitry is further configured to receive the first program directly from the first source and the second program directly from the second source.

57. A method for providing channel guide information listings, the method comprising:
receiving, using processing circuitry in a user device, channel guide information listings, the received listings include channel guide information corresponding to at least two program sources, each program source operative to transmit a plurality of television channels;
storing, using the processing circuitry, a channel guide having program listings for the plurality of television channels, the channel guide includes the channel guide information corresponding to the at least two program sources, wherein the processing circuitry is configured to receive:
  a first program corresponding to a first one of the program listings, that corresponds to a first of the at least two sources, using a first receiver of the user device from the first source using a first transmission scheme, and
  a second program corresponding to a second one of the program listings, that corresponds to a second of the at least two sources, using a second receiver of the user device from the second source using a second transmission scheme which is different from the first transmission scheme; and
simultaneously displaying, on a display device, at least some of the listings and a representation of each of the at least two program sources.

58. The method of claim 57, wherein the first receiver includes a first tuner and the second receiver includes a second tuner, and further comprising:
  receiving a user selection of one of the displayed listings;
  in response to receiving the user selection, selecting one of the first tuner and the second tuner, wherein:
    the first tuner is selected when the selected program listing is the first program listing corresponding to the first program; and
    the second tuner is selected when the selected program listing is the second program listing corresponding to the second program; and
  accessing the program corresponding to the selected program listing using the selected tuner.

59. The method of claim 57, wherein the channel guide information listings are received from a single data source.

60. The method of claim 57 wherein:
  the channel guide information listings corresponding to the first source are received from the first source; and
  the channel guide information listings corresponding to the second source are received from the second source.

61. The method of claim 57 further comprising:
  mixing and sorting the channel guide information received from the at least two sources in a desired order; and
  generating a display with the channel guide information presented in the desired order.

62. The method of claim 57, wherein said storing further comprises: automatically deleting duplicate listings from the channel guide.

63. The method of claim 57, further comprising: storing a signal source identifier for each program listing, each identifier identifying the transmission scheme of one of the at least two sources.

64. The method of claim 57, further comprising switching an input of the processing circuitry from the first source to the second source.

65. The method of claim 57, further comprising:
  disconnecting an input of the processing circuitry from the first source; and
  connecting the input of the processing circuitry to the second source.

66. The method of claim 57, further comprising receiving the first program from the first source independently of the second source.

67. The method of claim 57, further comprising receiving the first program directly from the first source and the second program directly from the second source.

68. A system for providing channel guide information listings, the system comprising:
  processing circuitry in a user device configured to:
    receive channel guide information listings, the received listings include channel guide information corresponding to at least two program sources, each program source operative to transmit a plurality of television channels;
    store a channel guide having program listings for the plurality of television channels, the channel guide includes the channel guide information corresponding to the at least two program sources; and
    receive:
      a first program corresponding to a first one of the program listings, that corresponds to a first of the at least two sources, using a first receiver of the user device from the first source using a first transmission scheme, and
      a second program corresponding to a second one of the program listings, that corresponds to a second of the at least two sources, using a second receiver of the user device from the second source using a second transmission scheme which is different from the first transmission scheme; and
  a display configured to simultaneously display at least some of the listings and a representation of each of the at least two program sources.

69. The system of claim 68, wherein the first receiver includes a first tuner and the second receiver includes a second tuner, and wherein the processing circuitry is further configured to:
  receive a user selection of one of the displayed listings;
  in response to receiving the user selection, select one of the first tuner and the second tuner, wherein:
    the first tuner is selected when the selected program listing is the first program listing corresponding to the first program; and
    the second tuner is selected when the selected program listing is the second program listing corresponding to the second program; and
  access the program corresponding to the selected program listing using the selected tuner.

70. The system of claim 68, wherein the channel guide information listings are received from a single data source.

71. The system of claim 68 wherein:
  the channel guide information listings corresponding to the first source are received from the first source; and
  the channel guide information listings corresponding to the second source are received from the second source.

72. The system of claim 68, wherein the processing circuitry is further configured to:
  mix and sort the channel guide information received from the at least two sources in a desired order; and
  generate a display with the channel guide information presented in the desired order.

73. The system of claim 68, wherein the processing circuitry is configured to store the channel guide by automatically deleting duplicate listings from the channel guide.

74. The system of claim 68, wherein the processing circuitry is further configured to store a signal source identifier for each program listing, each identifier identifying the transmission scheme of one of the at least two sources.

75. The system of claim 68, wherein the processing circuitry is further configured to switch an input of the processing circuitry from the first source to the second source.

76. The system of claim 68, wherein the processing circuitry is further configured to:
disconnect an input of the processing circuitry from the first source; and
connect the input of the processing circuitry to the second source.

77. The system of claim 68, wherein the processing circuitry is further configured to receive the first program from the first source independently of the second source.

78. The system of claim 68, wherein the processing circuitry is further configured to receive the first program directly from the first source and the second program directly from the second source.

79. A method for providing channel guide information listings, the method comprising:
receiving, using processing circuitry in a user device, channel guide information listings, the received listings include channel guide information corresponding to at least two program sources, each program source operative to transmit a plurality of television channels, wherein a first program source of the at least two program sources is configured to transmit a first program using a first transmission scheme, and wherein a second program source of the at least two program sources is configured to transmit a second program using a second transmission scheme that is different than the first transmission scheme;
storing, using the processing circuitry, a channel guide having program listings for the plurality of television channels, the channel guide includes the channel guide information corresponding to the at least two program sources wherein the processing circuitry is configured to receive:
the first program corresponding to a first one of the program listings, that corresponds to a first of the at least two sources, using a first receiver of the user device from the first source, and
the second program corresponding to a second one of the program listings, that corresponds to a second of the at least two sources, using a second receiver of the user device from the second source; and
simultaneously displaying, on a display device, at least some of the listings and a representation of each of the at least two program sources, wherein each of the displayed listings includes an indication of a transmission scheme used to transmit a corresponding program.

80. The method of claim 79, wherein the first receiver includes a first tuner and the second receiver includes a second tuner, and further comprising:
receiving a user selection of one of the displayed listings;
in response to receiving the user selection, selecting one of the first tuner and the second tuner, wherein:
the first tuner is selected when the selected program listing is the first program listing corresponding to the first program; and
the second tuner is selected when the selected program listing is the second program listing corresponding to the second program; and
accessing the program corresponding to the selected program listing using the selected tuner.

81. The method of claim 79, wherein the channel guide information listings are received from a single data source.

82. The method of claim 79 wherein:
the channel guide information listings corresponding to the first source are received from the first source; and
the channel guide information listings corresponding to the second source are received from the second source.

83. The method of claim 79 further comprising:
mixing and sorting the channel guide information received from the at least two sources in a desired order; and
generating a display with the channel guide information presented in the desired order.

84. The method of claim 79, wherein said storing further comprises: automatically deleting duplicate listings from the channel guide.

85. The method of claim 79, further comprising switching an input of the processing circuitry from the first source to the second source.

86. The method of claim 79, further comprising:
disconnecting an input of the processing circuitry from the first source; and
connecting the input of the processing circuitry to the second source.

87. The method of claim 79, further comprising receiving the first program from the first source independently of the second source.

88. The method of claim 79, further comprising receiving the first program directly from the first source and the second program directly from the second source.

89. A system for providing channel guide information listings, the system comprising:
processing circuitry in a user device configured to:
receive channel guide information listings, the received listings include channel guide information corresponding to at least two program sources, each program source operative to transmit a plurality of television channels, wherein a first program source of the at least two program sources is configured to transmit a first program using a first transmission scheme, and wherein a second program source of the at least two program sources is configured to transmit a second program using a second transmission scheme that is different than the first transmission scheme;
store a channel guide having program listings for the plurality of television channels, the channel guide includes the channel guide information corresponding to the at least two program sources;
receive:
the first program corresponding to a first one of the program listings, that corresponds to a first of the at least two sources, using a first receiver of the user device from the first source, and
the second program corresponding to a second one of the program listings, that corresponds to a second of the at least two sources, using a second receiver of the user device from the second source; and
a display configured to simultaneously display at least some of the listings and a representation of each of the at least two program sources, wherein each of the displayed listings includes an indication of a transmission scheme used to transmit a corresponding program.

90. The system of claim 89, wherein the first receiver includes a first tuner and the second receiver includes a second tuner, and wherein the processing circuitry is further configured to:
receive a user selection of one of the displayed listings;
in response to receiving the user selection, select one of the first tuner and the second tuner, wherein:
the first tuner is selected when the selected program listing is the first program listing corresponding to the first program; and
the second tuner is selected when the selected program listing is the second program listing corresponding to the second program; and access the program corresponding to the selected program listing using the selected tuner.

91. The system of claim 89, wherein the channel guide information listings are received from a single data source.

92. The system of claim 89 wherein:
the channel guide information listings corresponding to the first source are received from the first source; and
the channel guide information listings corresponding to the second source are received from the second source.

93. The system of claim 89 wherein the processing circuitry is further configured to:
mix and sort the channel guide information received from the at least two sources in a desired order; and
generate a display with the channel guide information presented in the desired order.

94. The system of claim 89, wherein the processing circuitry is configured to store the channel guide by automatically deleting duplicate listings from the channel guide.

95. The system of claim 89, wherein the processing circuitry is further configured to switch an input of the processing circuitry from the first source to the second source.

96. The system of claim 89, wherein the processing circuitry is further configured to:
disconnect an input of the processing circuitry from the first source; and
connect the input of the processing circuitry to the second source.

97. The system of claim 89, wherein the processing circuitry is further configured to receive the first program from the first source independently of the second source.

98. The system of claim 89, wherein the processing circuitry is further configured to receive the first program directly from the first source and the second program directly from the second source.

* * * * *